Figure 1:
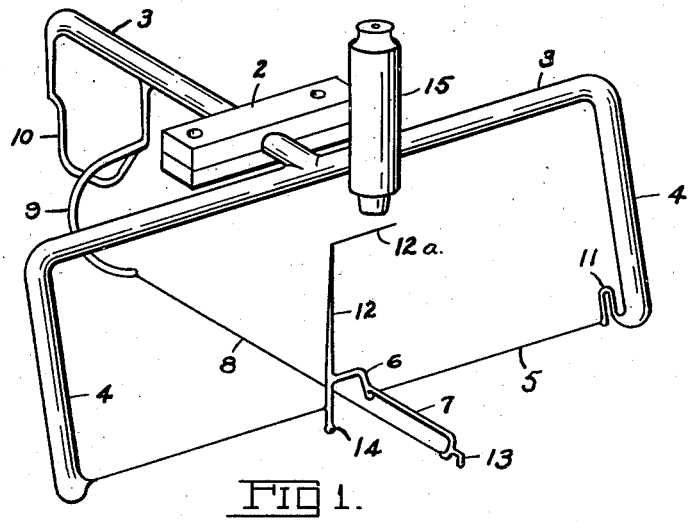

Sept. 20, 1938.　　　L. M. MOTT-SMITH　　　2,130,648

TORSION GRAVIMETER

Filed July 23, 1935

Lewis M. Mott-Smith
INVENTOR.

BY
ATTORNEY.

Patented Sept. 20, 1938

2,130,648

UNITED STATES PATENT OFFICE 2,130,648

TORSION GRAVIMETER

Lewis M. Mott-Smith, Houston, Tex.

Application July 23, 1935, Serial No. 32,756

12 Claims. (Cl. 265—1.4)

This invention relates generally to surveying instruments and specifically to gravity actuated surveying instruments that are particularly useful in surveying subsurface formations for the location of oil and other minerals.

Conventional gravity surveying instruments include a weight, an elastic medium to resist the movement thereof by gravity, labilizing means, such as a period spring or the like, to effect a further movement of the weight after it is initially moved by gravity, and means to observe and compare the movements of the weight to ascertain the forces of gravity at various points on the earth's surface. As the forces exerted by gravity at various points on the earth's surface are dependent upon subsurface formations, and as oil and other minerals are usually present in certain formations, the surveyor can by noting the differing forces of gravity at various points on the earth's surface ascertain the subsurface formations, and therefore, the probable location of oil and other minerals.

The differences between the forces of gravity at various points on the earth's surface are exceedingly small, and various efforts have heretofore been made to provide an instrument to reliably detect these exceedingly small differences. It is desired that the accuracy thereof be such as to detect a variation of one ten millionth of the whole force of gravity. The fundamental requirement of an accurate instrument is that the movement of its weight actuated indicator be affected principally by gravity and as little as possible by other causes, such as change in temperature resulting in change in dimension and reduction of resistance to temporary deformation, and such as elastic after-effect which prevents a resumption of initial shape.

This invention has for its general object to provide a new and improved instrument which is very sensitive to minute changes in the forces of gravity, and which is not objectionably affected by disturbing influences.

The instruments heretofore provided, of the general type herein described, have been unreliable because of the disturbing factors created by making the operable parts of different materials of varying elasticity and by providing inefficient couplings therefor. This invention has for one of its specific objects the provision of a new and improved instrument wherein the parts responsive to gravity are integral and of the same material to eliminate such disturbing factors, and to provide an assembly of high rigidity and good elasticity.

The chief advantages of making the parts of the instrument of the same integral elastic material throughout are two, namely, that the completed structure will then have no differential expansion when temperature changes occur, and second, that all parts of the device including the joints will be of substantially uniform elasticity. That is to say, if the support for example is made of one material and the torsion wire of another, the differential expansion upon an extremely slight change in temperature (a smaller change than can be prevented by apparatus now known) warping of the parts may take place, and this warping will have the effect of changing the ability of the torsion fiber to resist displacement, and to in fact cause undesired displacement of the weight arm. This obviously would entirely upset the character of the readings obtained from the device and destroy their value. Even if the parts are all made of the same elastic material so that differential expansion due to temperature changes will not exist, but if the parts are not made integral but are joined together by wax, for instance, which is usually employed in joining together parts made of quartz, or are joined together by solder or some other material having different yield characteristics from the material of which the respective parts are made, the joints may slowly yield, thus changing the characteristics of the entire device and relieving the tension on the torsion fiber, or they may show elastic "after effect", otherwise known as elastic "hysteresis". This is a sluggish elastic effect. That is, when placed under load there would be some yielding, and this yield would not be recovered until some little time after the load has been removed. Either a slow yielding such as first mentioned, or an elastic after effect such as last mentioned, would throw the readings off to a very great extent and render the device greatly inferior for the purpose for which it was intended.

Instruments of this general type are provided with leveling means whereby the instrument is leveled before a reading thereof is taken, and the construction of prior instruments is such that if the instrument be not very accurately leveled, the indication given thereby is very defective. This invention has for another of its specific objects the provision of a new and improved instrument embodying indicating means, the sensitivity of which is not appreciably affected by slight inaccuracies in the leveling thereof.

Another specific object of the invention is the provision of an instrument of this character which is so exceedingly small and light that the air itself in the sealed instrument casing will quickly bring to rest the gravity operable parts thereof, and the various other advantages of an exceedingly small and light construction will be enjoyed.

A further specific object is to provide a new and improved instrument having the advantages referred to that may be manufactured at a cost far less than the cost of conventional instruments now in use.

Other objects will hereinafter appear.

Figure 2:
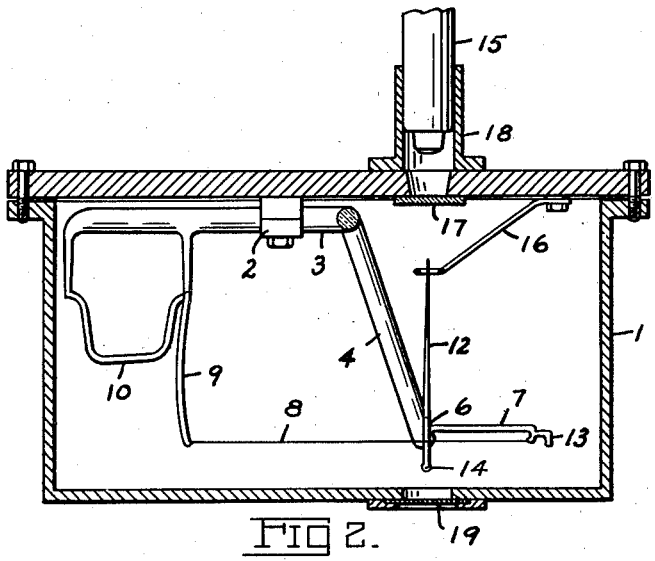

The preferred embodiment of the invention is illustrated by the accompanying drawing, wherein Fig. 1 is a perspective view of certain internal parts of the instrument removed from the casing; Fig. 2 is a sectional fragmentary view of the instrument.

In the drawing the casing is indicated at 1, and may be of any desired form. Connected to the top of the casing 1 by means of a clamp 2 is a T-shaped frame or support 3 having depending spaced arms 4. Connected to the arms 4 is a torsion fiber 5 having a substantially vertically off-set portion 6, carrying a substantially horizontally extending weight arm 7, which is in turn connected to a fiber or labilizer 8 which extends rearwardly and is connected to a primary spring 9 and a secondary spring 10, the latter being connected to the rear end of the frame 3. The numeral 11 indicates a spring which connects the torsion fiber 5 to the adjacent arm of the frame 3 for a purpose which will hereinafter appear. The numeral 12 indicates an upright pointer connected to the off-set portion 6 of the torsion fiber 5, and having on its lower end a counterbalance 14. On the end of the weight arm 7 is a projection 13 for a purpose which will hereinafter appear. The numeral 15 indicates a microscope through which the movement of the lateral extension 12a of the pointer 12 may be observed.

The yoke 16 prevents excessive oscillation of the suspended system, limiting the motion to that needed to give the desired range of reading.

A glass window 17 is cemented to the top of the casing 1 just above the pointer 12 so that the pointer may be observed through the microscope 15, the top of the latter being rigidly attached as indicated at 18 to the top of the casing 1. Cemented in the bottom of the casing 1 is another glass window 19 for the admission of light provided by a small lamp (not shown) supported just below it.

In the preferred embodiment of the invention all of the parts numbered 3 through 14 are made integral by fusing and are of the same material. I prefer the use of quartz as the material referred to. It is necessary that such material be very rigid, that it have a small temperature expansion, that it not change weight (as would occur on oxidation of common metals) and that it not change its size or shape because of gradual relaxing of internal strains.

As to dimensions: The casing 1 may be a cylindrical box about 2 inches deep and about five inches in diameter. The quartz frame 3 may be made of a round rod about ¼ inch in diameter and of linear dimensions such that it just goes into the casing 1. The torsion fiber 5 is about 1½ inches long and about .002 inch in diameter. The weight arm 7 is about 1 inch long as is also the pointer 12. The fiber 8 is about .0005 inch in diameter and 2 inches long. The remaining dimensions will be apparent to those skilled in the art.

The weight arm 7 is fixed to and normally extends substantially horizontally from the torsion fiber 5. The center of gravity of the suspended system (which includes in the preferred embodiment shown the arm 7 and its extension 13, pointer 12, counterweight 14 and off-set portion 6) is placed as nearly as possible at the same level as the torsion fiber 5. The counterweight 14 is provided for this purpose. This prevents minor errors in leveling the instrument from appreciably affecting the reading thereof.

The position of equilibrium is adjusted by adding or removing quartz by fusion to or by bending in and out the projection 13 on the weight arm 7. When finally adjusted the weight arm 7 and connected pointer 12 are in equilibrium with the center of gravity substantially horizontally out from the torsion fiber.

The fiber 8 serves as a labilizer and normally passes substantially through the axis of rotation of the torsion fiber 5, the off-set portion 6 being provided for this purpose. When the weight arm 7 is swung downwardly by gravity against the resistance of torsion fiber 5, the fiber 8 up to that time inactive because extending thru the axis of torsion fiber 5, is swung down below said axis, whereupon it becomes active to move the weight arm 7 further so that its movement may be quite easily observed. As the function of the fiber 8 is therefore opposite to that of a stabilizer, it is referred to as a labilizer. The desired tension in the fiber 8 may be roughly created by heating and bending spring 9, and with a greater degree of accuracy by heating and bending spring 10. The tension of the torsion fiber 5 may be regulated by heating and bending the U-shaped spring member 11, after the torsion fiber has been given about a quarter turn and fused to the arms 4.

While in the preferred embodiment the movement of the lateral extension 12a of the pointer 12 is observed through the microscope 15 as indicated, the microscope may, of course, be placed in a substantially horizontal position, and the movement of the arm 7 read by observing the arm 7 itself, the arm 12 and counterweight 14 in that event being, of course, eliminated.

The single clamp 2 provides a one-point connection between the casing 1 and frame 3 so that deformations of the casing do not cause deformations of the frame and consequent movement of the operable elements out of their normal relative positions.

The casing is air-tight and some well-known drying agent (not shown) is placed therein to keep the air very dry, so that the air inside may be kept at a constant density. This prevents the necessity of correcting the readings for changes in barometric pressure and relative humidity.

A source of error to be guarded against is the appearance of electrical forces acting on the operable parts. In accordance with well-known methods, a piece of radio-active material may be put inside the casing 1. The ionization it produces in the air quickly dissipates any possible electrification.

Various efficient levels well known to those skilled in the art may be used in connection with the instrument.

Although the temperature coefficient of the modulus of rigidity of quartz is only about .00012 per degree centigrade, if gravity is to be measured to 1 part in ten million, the rigidity cannot be allowed to change by more than this fraction. Since the rigidity increases by a little more than 1 par in ten thousand per degree centigrade, the quartz must be kept to within about .001 degree centigrade. It is highly desirable to maintain the operable elements at constant temperature to this accuracy. This may be done by immersing the casing (as well as the level not shown) into a thermostatically controlled water bath, such as are commonly used by chemists. The temperature control may be obtained by a so-called mercury toluene thermostat element or regulator.

In view of the foregoing it will be apparent to those skilled in the art that the preferred embodiment of my invention has the advantages of the prior two-spring system for improved freedom of sensitiveness to minor errors in leveling, and a good range of deflection wherein the sensitivity is practically constant, and that I am able to use a very good elastic material such as quartz, and have eliminated various disturbing factors by making the elements of one integral piece of this material.

Various modifications of the preferred embodiment, within the scope of the following claims, will be apparent to those skilled in the art.

I claim:

1. A gravity surveying apparatus including a torsion fiber; fixed supporting means connected to the ends of said fiber; a suspended system including a weight arm fixed to and extending outwardly from said fiber; said fiber and the center of gravity of said system being in substantially the same horizontal plane; a labilizer support; and a labilizer connected to said arm and said labilizer support and passing substantially thru the axis of said torsion fiber; said torsion fiber, weight arm and labilizer and those portions of said supports connected thereto being integral and of the same elastic material.

2. A gravity surveying apparatus including a torsion fiber; supporting means connected to the ends of said fiber; a suspended system including a weight arm fixed to and extending outwardly from said fiber; said fiber and the center of gravity of said system being in substantially the same horizontal plane; a labilizer support; and a labilizer connected to said arm and said labilizer support and passing substantially thru the axis of said torsion fiber.

3. A gravity surveying apparatus including a torsion fiber; supporting means connected to the ends of said fiber; a weight arm connected to said fiber; a labilizer support; and a labilizer connected to said arm and said labilizer support and passing substantially thru the axis of said torsion fiber; said torsion fiber, weight arm and labilizer and those portions of said supports connected thereto being integral and of the same elastic material.

4. A gravity surveying apparatus including a torsion fiber; a weight arm connected to said fiber; and a labilizer connected to said weight arm to accentuate movements thereof.

5. A gravity surveying apparatus including a casing; a support in said casing; a torsion fiber carried by said support, a weight arm connected to said fiber and a labilizer carried by said support and connected to said weight arm to accentuate movements thereof; and a one-point connection between said casing and said support.

6. A gravity surveying apparatus having a torsion fiber, a weight arm connected to said fiber, and a labilizer connected to said weight arm to accentuate movements thereof; said fiber and labilizer being in substantially the same plane.

7. A gravity surveying apparatus including a torsion fiber, a weight arm connected to said fiber, and a labilizer connected to said weight arm to accentuate movements thereof, said labilizer including a primary elastic support and a secondary elastic support connected to said primary elastic support.

8. A gravity surveying apparatus including a torsion fiber, a weight arm connected to said fiber, a labilizer connected to said weight arm to accentuate movements thereof, and a counterbalanced pointer on said weight arm.

9. A gravity surveying apparatus including a torsion fiber, a weight arm connected to said fiber, a labilizer connected to said weight arm to accentuate movements thereof, said torsion fiber being formed with an adjustable loop for adjusting the tension thereof.

10. A gravity surveying apparatus including a torsion fiber, a weight arm connected to said fiber, and a labilizer connected to said weight arm to accentuate movements thereof, said weight arm having an adjustable extension thereon whereby the effect of the weight arm may be adjusted.

11. In a gravity surveying apparatus, a support having spaced arms, a torsion fiber stretched between said arms and lying in a direction other than vertical, and a weight arm extending laterally from said fiber, said support, fiber and weight arm all being of the same elastic material, and integrally united.

12. In a gravity surveying instrument, a support comprising a bar having a pair of spaced arms projecting therefrom at its ends, a torsion fiber stretched between said arms, and a suspended system including a weight, carried by said fiber, said support, fiber and suspended system all being formed throughout of quartz material, and integrally united.

LEWIS M. MOTT-SMITH.